United States Patent [19]
Auer et al.

[11] Patent Number: 5,427,608
[45] Date of Patent: Jun. 27, 1995

[54] METHOD OF SEPARATING SOLID AND/OR LIQUID PARTICLES AND/OR POLLUTING GAS FROM A GAS STREAM, AND APPARATUS FOR CARRYING OUT THE METHOD

[75] Inventors: Werner Auer, Linz; Walter Gebert, St. Marien; Franz Parzermair, Attnang-Puchheim; Harald Fürschuss, Asten; Sotirios Raptis, Linz, all of Austria

[73] Assignee: Voest Alpine Industrieanlagenges, m.b.H., Austria

[21] Appl. No.: 311,909

[22] Filed: Sep. 26, 1994

Related U.S. Application Data

[63] Continuation of Ser. No. 980,808, filed as PCT/AT91/00077, Jun. 28, 1991, abandoned.

[51] Int. Cl.⁶ .................................. B03C 3/014
[52] U.S. Cl. ............................ 95/65; 55/228; 95/66; 95/224; 96/53; 261/115
[58] Field of Search ............... 95/64, 65, 224, 223, 95/66, 225; 96/53; 55/238, 228; 261/115–118

[56] References Cited

U.S. PATENT DOCUMENTS

| | | | |
|---|---|---|---|
| 2,935,375 | 5/1960 | Boucher | 55/238 X |
| 3,315,445 | 4/1967 | De Seversky | 55/238 X |
| 4,067,703 | 1/1978 | Dullien et al. | 95/218 |
| 4,302,226 | 11/1981 | Rafson et al. | 55/238 |
| 4,980,099 | 12/1990 | Myers et al. | 261/116 |

FOREIGN PATENT DOCUMENTS

| | | | |
|---|---|---|---|
| 1088926 | 9/1960 | Germany | 95/224 |
| 3329638 | 3/1985 | Germany | |
| 3918452 | 12/1990 | Germany | |
| 9005015 | 5/1990 | WIPO | |

*Primary Examiner*—Richard L. Chiesa
*Attorney, Agent, or Firm*—Henry M. Feiereisen

[57] ABSTRACT

A method and apparatus for separating solid and/or liquid particles and/or polluting gas from a gas stream includes two component nozzles by which a washing liquid is finely distributed in a gaseous phase and introduced in the gas stream within a gas washer. The two-component nozzles are distributed over the whole cross section of the washer, preferably on a plane that extends perpendicularly to the gas flow direction.

8 Claims, 4 Drawing Sheets

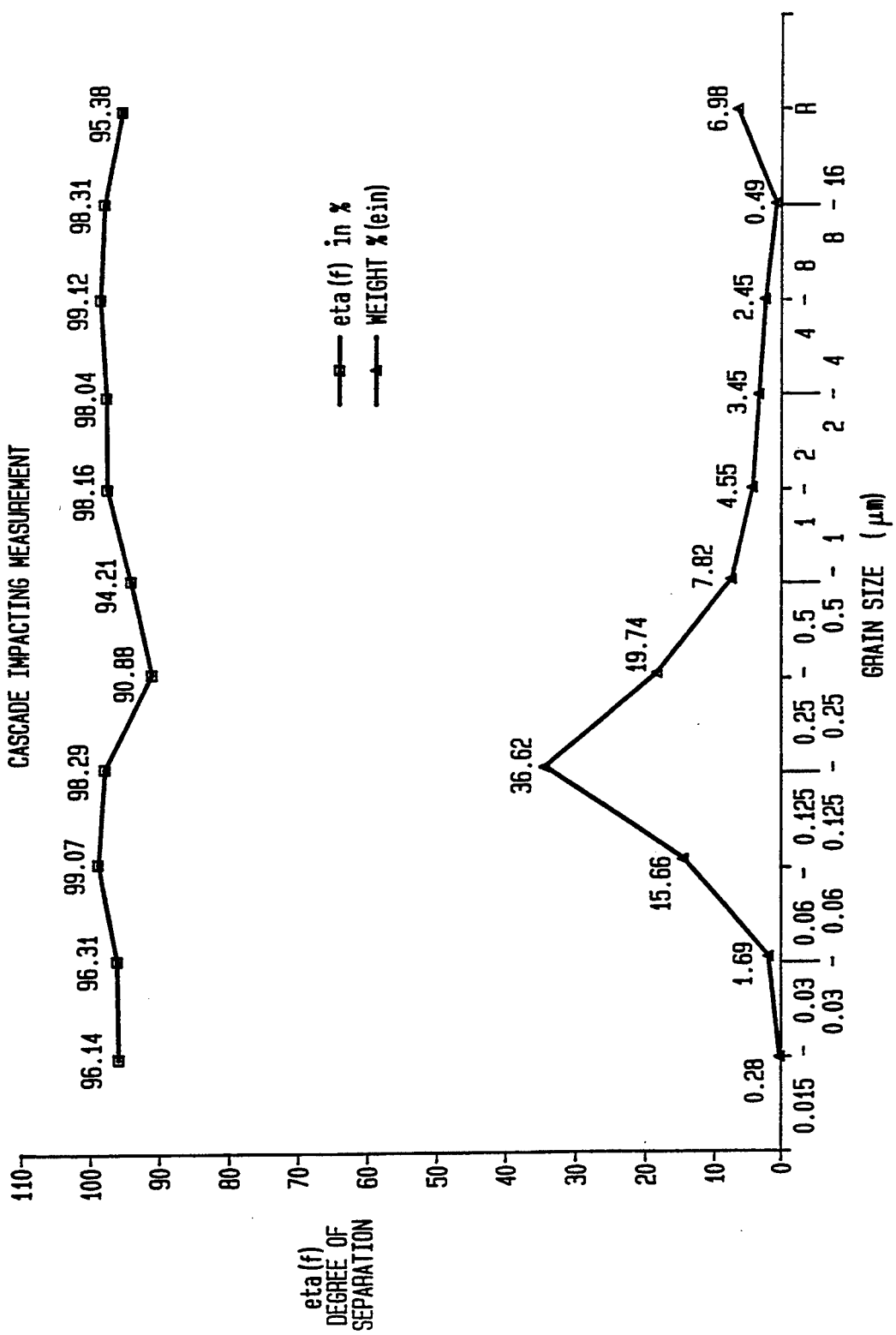

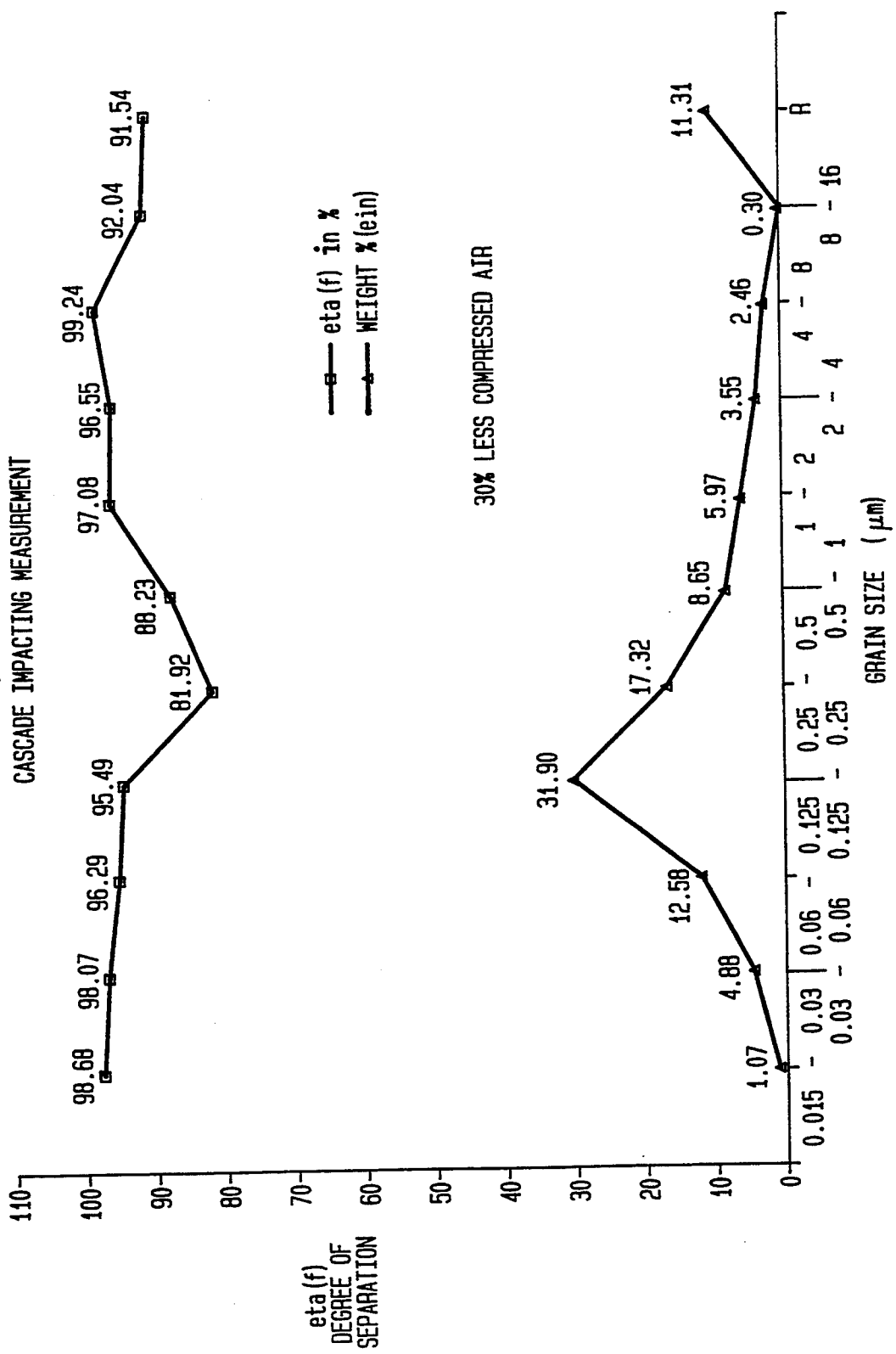

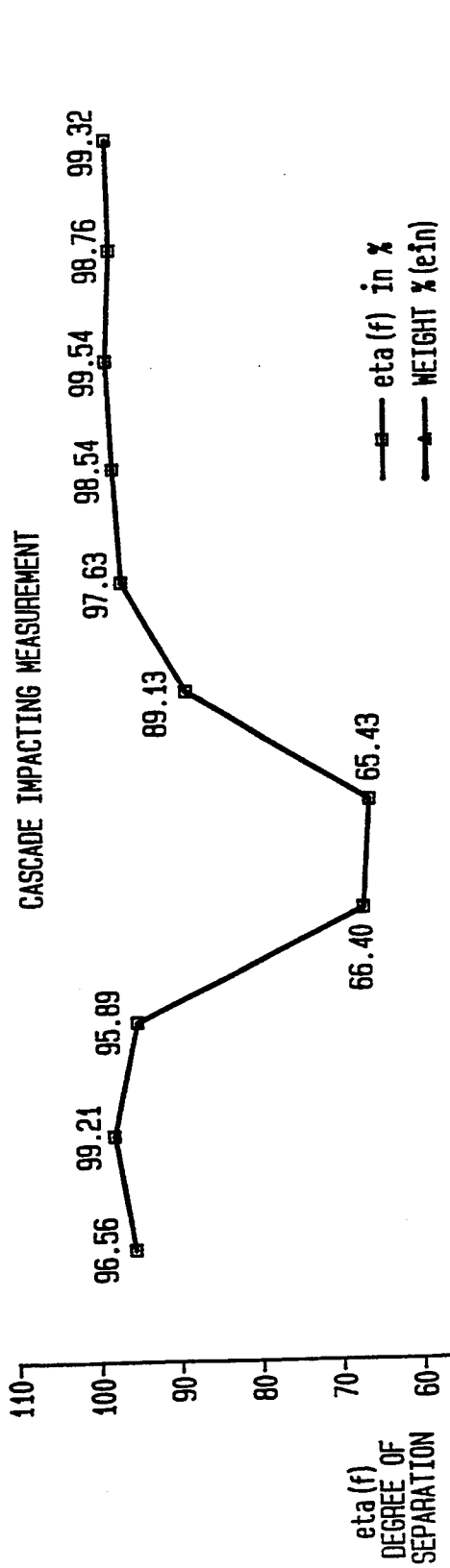

METHOD OF SEPARATING SOLID AND/OR LIQUID PARTICLES AND/OR POLLUTING GAS FROM A GAS STREAM, AND APPARATUS FOR CARRYING OUT THE METHOD

This is a continuation of application Ser. No. 07/980,808, filed as PCT/AT91/00077, Jun. 28, 1991, now abandoned.

BACKGROUND OF THE INVENTION

The invention refers to a method of separating solid and/or liquid particles and/or polluting gas from a gas stream by utilizing a washing liquid which is superfinely distributed in a gaseous phase and introduced in the gas stream, as well as to an apparatus for carrying out the method.

Great technical problems are experienced during separation of superfine dust at a grain size of less than 0.5 $\mu$m. Dust particles of this size are created by various technical processes, less because of comminution processes but mainly because of a buildup from the gas phase via condensation, coagulation and/or desublimation.

Chemical analysis of sintered dust which remained in the exhaust gas after a conventional dust removal revealed that it can contain a very high degree of alkali salts which are formed during the sintering process from the gas phase. This high fraction of salt aerosols leads to a very great fineness of the dust, with the dust containing a high fraction of particles which have an aerodynamic diameter of less than 0.2 $\mu$m.

It is known from the literature that a separation minimum exists for a grain size range of 0.1–0.3 $\mu$m since the forces of inertia decrease superproportionally with decreasing particle size and the diffusion forces are not yet sufficiently effective.

Greater problems are also experienced when significant differences in concentration, quantity and physicochemical properties of the aerodispersion occur during continuous operation.

Besides conventional dry filters, dust scrubbing proved the leading method for separating fine dust as well as liquid and gaseous pollutants.

The effectiveness of the wet scrubber is based on a binding of pollutants in a liquid phase during washing of the aerodispersion. The reason for the conversion of the pollutants into the liquid phase are the forces of inertia and diffusion forces as well as potentially electrical forces.

Conventional methods such as described in DE-OS 37 14 749 and in DE-PS 27 46 975 employ for contacting dust and water mist droplets pipes which include cross-sectional constrictions, such as e.g. a Venturi segment, for improving the flow rate of the raw gas. A cleansing liquid is added into this pipe segment or directly thereafter in order to create an intimate mixture between gas and mist droplets through strong turbulences during the pressure change of the gas stream.

Drawbacks include the high pressure drop so that the energy consumption increases, and the extremely short contact period (<0.4 sec) so that the fractional degree of separation is adversely affected.

U.S. Pat. No. 4,067,703 discloses a dust scrubber in which the washing zone or spraying zone essentially includes a conduit of a diameter and length which are dimensioned such that a steady turbulence as well as a relatively long retention time for the contact between the solid particles and the wash water droplets are created. By means of a nozzle, wash water is very finely distributed in the gas stream which is to be freed from dust. The dust-laden wash water is separated in a separator which is built around a centrifugal blower and includes an immersion tube for the sludge drain.

This nozzle is arranged in the gas stream, with a minimal distance being maintained between the nozzle and the blower so that the spray cone completely fills out the interior of the pipe. This US-PS refers to an example with a ratio of the distance between nozzle to blower: pipe diameter=5:1. Upon using two-component nozzles (compressed air/water), droplet sizes between 5 and 100 $\mu$m are possible, with the greatest portion measuring between 10 and 30 $\mu$m.

Following the spray zone is the low-pressure blower which serves not only for transporting the dust-gas mixture but expands the contact space for impacting of the dust particles beyond the area of the two-component nozzle. At the same time, this blower is supposed to promote the coagulation of the water droplets. Dust collected together with water is discharged within the blower through an immersion tube with water seal into a sludge tank.

The separation curves measured for this dust scrubber (see FIG. 6 of the US-PS) have a minimum at about 0.4 $\mu$m particle size. This points to the existence of dust particles which, on the one hand, are too small for inertia effects and, on the other hand, too large for diffusion effects.

This dust separator has thus the following drawbacks:

The operation is possible only with clean water, resulting in a high waste water accumulation the gas throughput is limited the material strength is subjected to high stress through corrosion and erosion the flexibility in the gas throughput and dust throughput is low the pressure loss is high.

DE-AS 25 20 957 describes a method of purifying sintered exhaust gases, with a first partial stream of the exhaust gases which has a small content of gases or vapor-like pollutants being collected from air boxes below the first and last part of the sintering machine and being freed essentially from dust in a first electrostatic gas purification. A second partial stream with a higher pollutant load is withdrawn from intermediary located air boxes and freed from dust in a second electrostatic gas purification, thereafter freed from polluting gases or vapor in a gas scrubber and then released into the atmosphere via a chimney.

This combination has however the following drawbacks:

Tests conducted by the inventors with the known plant showed that the curve for the fractional degree of separation has a clear minimum at a particle diameter of 0.2 $\mu$m.

The separated collection, drain and purification of two differently laden exhaust gas streams significantly complicates the apparatus.

SUMMARY OF THE INVENTION

It is an object of the present invention to separate extremely fine grain particles at a particle size of less than 1 $\mu$m from a gas stream, with the fractional degree of separation in the monitorable grain size range from 0.01 $\mu$m having no or only a negligibly small minimum.

Moreover, it is an object of the present invention to flexibly control an optimum degree of separation with respect to the energy consumption.

In accordance with the invention, this object is attained by introducing the washing liquid into the gas stream from several locations distributed on a plane over the whole cross section of the gas stream, with each location being fed separately with atomizing gas and washing liquid. In this manner, a corresponding amount of washing liquid is introduced evenly over the entire gas stream.

Advantageously, the amount of atomizing gas and the amount of washing liquid can be adjusted in dependence of the grain size distribution of the pollutant, i.e. that based on the ratio between atomizing gas and washing liquid, the size of the washing liquid particles and their number can be best suited to prevailing conditions given by the grain size distribution. Further, several planes for introducing washing liquid can be arranged successively so as to attain an even more precise control of the separation.

The separation mechanism operates as follows:

The pollutants and the saturated gas stream reach the area of the first nozzle plane in which the fine particles are enveloped by a water film. This is effected through thermophoresis (a further undercooling of the gas stream is created in the nozzle area to thereby result in oversaturation), through separation by inertia (larger particles impact the droplets and enter the liquid phase through the force of the impact), and through turbulent diffusion, respectively. Through possible incorporation of a second nozzle plane, the agglomerated particles exiting the first treatment zone can be afterpurified especially through inertia effects. In order to attain the required retention time of the gas stream in the washing zone, the flow rate of the gas can be maintained during washing to maximum 5 m/sec. Moreover, the pressure drop is kept very low within this zone. In order to obtain a first enlargement of the aerosols which are contained in the gas stream, the gas stream to be purified can be saturated with liquid prior to introduction of the washing liquid. Further, the gas stream can be ionized between the saturation with liquid and the washing so that the existing particle charge allows introduction of washing liquid at lower energetic consumption. In order to keep the strain upon the drainage ditch with washing liquid as low as possible, the washing liquid can be circulated, with solids contained in the washing liquids sedimenting within the circulation. The gas stream can be saturated with liquid prior to washing, with the saturation temperature amounting to about 40°–70° C.

In an advantageous apparatus for carrying out the method according to the invention, which is equipped with a gas scrubber including two-component nozzles, the two-component nozzles are distributed in accordance with the invention over the whole cross-section of the scrubber on a plane which is preferably oriented normal to the direction of the gas flow. In this manner, the previously referred to even distribution of the washing liquid particles is accomplished over the whole cross-section of the gas stream.

Advantageously, the gas scrubber is preceded by a conventional quencher to allow, on the one hand, adjustment of the saturation temperature of the gas stream to 40°–70° C. and, on the other hand, creation of a complete moisture saturation of the gas stream. Coulomb forces are introduced during the ionization by interposing between the quencher and the gas scrubber an ionization stage in which several spray electrodes and several precipitation electrodes as opposite pole are provided. Moreover, further planes of two-component nozzles may be arranged in the gas scrubber subsequently to the first plane of two-component nozzles. The different speed of the gas stream and of the nozzle exit stream and the pressure differences associated therewith result in a return flow outside the area of the nozzle stream (pulse conservation). This creates a high degree of turbulences so that the one part of the gas stream, which passes through in a so-called dead stream between two neighboring nozzles or between nozzle and the inside wall of the pipe without being acted upon by the nozzle stream, is diverted and is forced to again pass through the nozzle area. This means that the gas stream which is not picked up by the nozzles during the first passage is primarily guided in the second circulation until being forced through the core zone of the nozzle stream in direction of the second nozzle plane in which an increased agglomeration of the pollutants and aerosols is achieved. This second nozzle plane is operated, if necessary, at smaller nozzle outlet speed to create greater droplet diameters of the washing liquid to thereby accomplish an especially good afterpurification following the first nozzle zone by means of the inertia effects. Depending on the geometry of the scrubber and the speed of the gas stream, the area of a nozzle plane effective for separation extends from the nozzle plane up to about 1.5 m upstream in flow direction of the gas stream. The distance of the nozzles in each plane is variable. Each of these nozzles or each group of nozzles is separately fed with atomizing gas, on the one hand, and circulating liquid, on the other hand, so that a greatest possible adaptation to prevailing gas purification conditions is achieved. An increase of the liquid throughput through the nozzles reduces the need for atomizing gas so that a change of the size and of the number of droplets is accomplished. Thus, in dependence on the grain distribution, the dust load, the degree of separation can be correspondingly controlled via the amount of atomizing gas and the amount of liquid for the nozzles.

For that, each nozzle plane may include several nozzle lances which are provided with one or more two-component nozzles. Further, each of the two-component nozzles or each nozzle lance may be separately connected with feed pipes for atomizing gas and washing liquid.

Through the provision of the apparatus according to the invention, a randomly large volume of gas stream can be purified per time unit. The only restricting factor is the available space which may be of particular relevance in connection with retrofitting existing plants. Certainly, constructions with more than two parallel nozzle planes is conceivable. Which structure is applied in each case depends on the type of gas stream being purified and of economical factors.

BRIEF DESCRIPTION OF THE DRAWINGS

An exemplified embodiment of the subject matter of the invention is illustrated in the drawing.

FIGS. 2–4 are diagrams illustrating the impact of the ratio of atomizing gas to washing liquid.

DETAILED DESCRIPTION OF A PREFERRED EMBODIMENT

Figure 1:
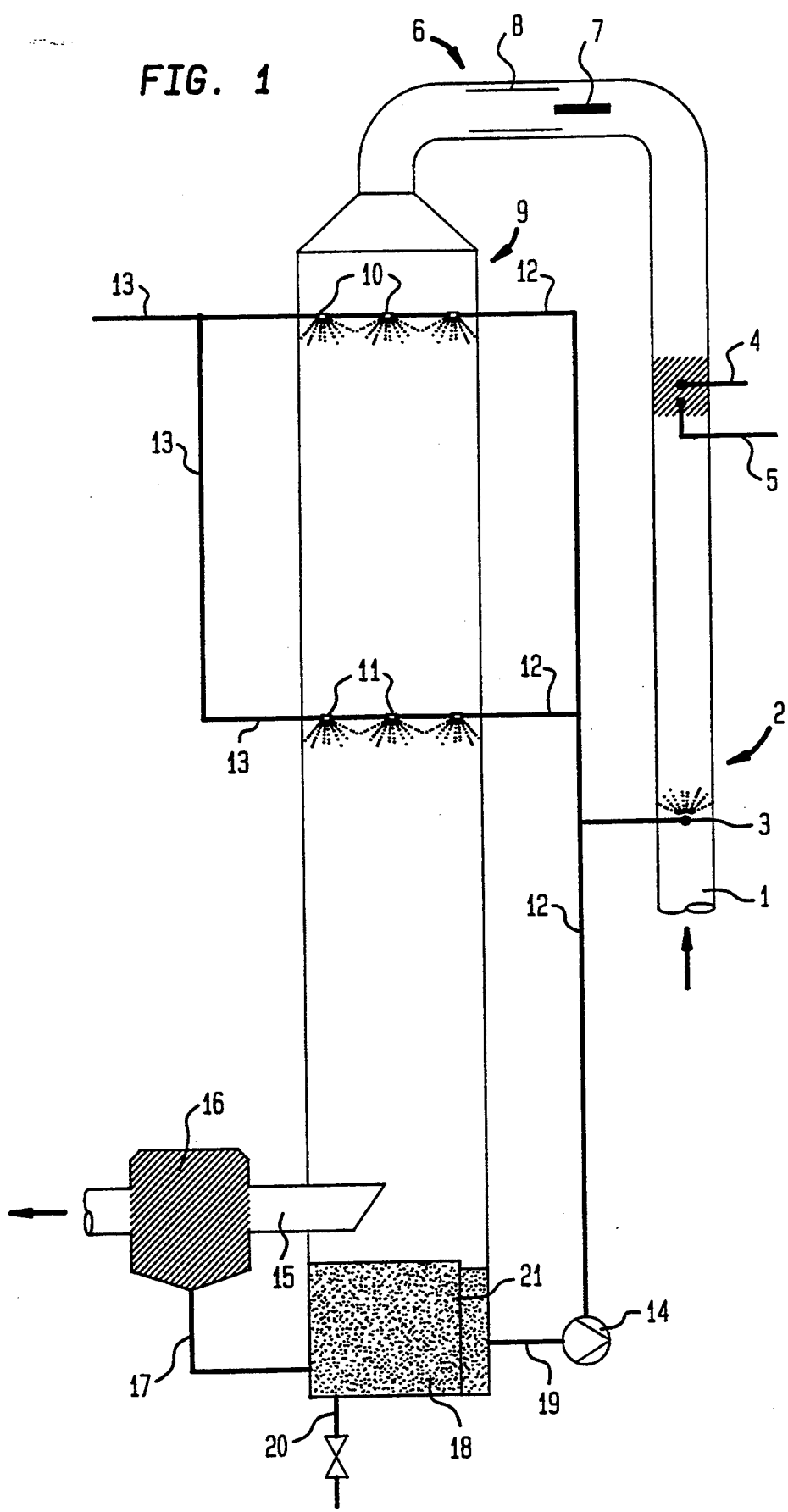
FIG. 1 shows schematically the apparatus according to the invention.

FIG. 1 shows a gas scrubber which is fed via the raw gas conduit 1 with possibly coarsely prepurified raw gas which enters a quencher 2. The quencher 2 is provided with a liquid injection 3 by which the raw gas is brought to a saturation temperature of 40°–70° C. and the raw gas is saturated with liquid. Coarse dust already retained in the liquid is separated in a mist collector 4 and discharged through an coarse outlet 5. The raw gas then reaches an ionization stage 6 in which a voltage is applied via a spray electrode 7 to a precipitation electrode 8. Within this ionization stage a high voltage prevails in the magnitude between 30 and 100 kV. The precipitation electrode is indicated here as pipe, however, may also be of honeycomb configuration or plate-shaped. This ionization stage enables a reduction of the specific energy demand by about 30%. Following this ionization treatment, the raw gas reaches the actual gas scrubber 9 which primarily is configured as cylindrical structural element and through which the raw gas flows in vertical direction from top to bottom. The gas scrubber 9 includes in a first plane two-component nozzles which are supplied with washing liquid from a pump 14 via conduits 12 and with atomizing fluid via conduits 13. Following the spray nozzles 10 is a further plane with spray nozzles 11 which are parallel connected to the nozzles 10 with regard to supply so that clean water is fed via conduits 12 and atomizing fluid via the conduits 13. These feed pipes are only schematically indicated in FIG. 1. In the actual configuration, each individual nozzle or each individual nozzle plane or groups of nozzles in the plane are supplied via separate conduits 12 and separate conduits 13 in such a manner that each nozzle includes a separate water feed pipe and a separate gas feed pipe. In a manner not shown, the nozzles 10 and 11 may be arranged along nozzle lances, with each nozzle lance including one or more two-component nozzles. After flowing through the gas scrubber, the purified gas exits through the clean gas outlet 15 and is guided through a further mist collector 16. The liquid particles laden with superfine particles exiting the mist collector enter via conduit 17 a sedimentation tank in which a partition wall 21 is provided by which the water laden with impurities is freed from sedimentary particles. Clean liquid overflowing the partition wall 21 is fed via conduit 19 to the pump 14 for return to conduit 12. The sludge fraction accumulating at the bottom of the sedimentation tank 18 is discharged via a sludge outlet 20. Coarse liquid exiting the mist collector 4 may also be fed to this sedimentation tank to thereby attain a further circulation of the washing liquid. An advantage of this liquid circulation is the possibility of keeping at a minimum the amount of waste water which has to be withdrawn from the apparatus and possibly subjected to a subsequent reprocessing. The transport of water via a sedimentation chamber reduces also the nozzle wear to a minimum.

The control of the purified dust content of the clean gas is attained continuously via the speed of the liquid circulation pump 14 or the nozzle admission pressure of the gas scrubber. When installing a measuring instrument for raw gas dust, the control loop can be accelerated through a feed-forward signal which is processed in a cascade control circuit.

FIGS. 2–4 illustrate separation curves in dependence of the ratio between cleaning liquid and atomizing gas supply.

The operational parameters for the tests which are illustrated by the graphical illustrations are as follows:
Dust entry: Up to 2000 mg/Nm$^3$ tr
Exhaust gas temperature before quencher: 120° C.
Exhaust gas temperature after quencher: 55° C.
L/G=1 l/Nm$^3$
Compressed air: 5 bar absolute
Sole concentration: 7 to 25 g/l Chloride
Exhaust gas amount: 15000 Nm$^3$/h f
Special energy demand 4.5 kW/1000 Nm$^3$f (without ionization)
Special energy demand 3.0 kW/1000 Nm$^3$f (with ionization).

As can be seen from FIGS. 3 and 4, a reduction of the fraction of atomizing gas, that is an increase of the circulating liquid amount, at the nozzles results in a reduction of the separating capacity of the superfine dust particles.

In short, the advantages of the system are:
Course of the fractional separation—over 90% of solid and liquid particles from 0.1 to 0.4 μm are covered
Operation with circulating liquid and thus minimization of waste water accumulation
Variable control of degree of separation through variation of the supply to the nozzles
Lower pressure loss (delta p<70 mmWS)
Construction with corrosion-resistant material is possible when using aggressive materials
Simultaneous separation of gaseous materials such as for example HCL, HF, SO$_2$, etc. (depending on the pH value) is possible
Higher degree of separation of pollutants regardless of the pollutant composition and the distribution of the pollutant particles.

We claim:

1. A method of separating solid and/or liquid particles and/or polluting gas from a gas stream, comprising the steps of:
    saturating a stream of raw gas in a quencher;
    removing coarse particles from the gas stream in a mist collector;
    introducing a superfinely distributed washing liquid and atomizing gas at several successively arranged planes in flow direction of an incoming gas stream from several locations distributed on each plane over the entire cross section of the gas stream for purifying the gas stream;
    removing liquid particles from the cleaned gas stream in a further mist collector; and
    removing sedimentary particles from the washing liquid to allow circulation of said washing liquid.

2. The method of claim 1, further comprising the step of ionizing the gas stream after said saturating step with liquid.

3. The method of claim 2 wherein said introducing step includes adjusting the amount of atomizing gas and the amount of washing liquid in dependence of a grain size distribution of pollutants.

4. The method of claim 2 wherein the flow rate of the gas stream is kept during washing to a maximum of 5 m/sec.

5. The method of claim 2 wherein said saturating step has a saturation temperature 40° C. to 70° C.

6. Apparatus for separating solid and/or liquid particles and/or polluting gas from a gas stream, comprising:

a quencher for saturating a stream of raw gas, said quencher including a first mist collector for discharging coarse particles from the stream of raw gas;

a gas scrubber for purifying the gas stream flowing vertically therethrough, said gas scrubber having a clean gas outlet and including a plurality of nozzle lances arranged at successive planes, with each nozzle lance being provided with two-component nozzles and extending perpendicular to the gas flow direction over the entire cross-section of said gas scrubber for introduction of a superfinely distributed washing liquid and atomizing gas in flow direction of the gas stream;

a further mist collector connected to said clean gas outlet and having a discharge outlet for exit of clean gas and a second outlet for washing liquid; and a separating means connected to said second outlet of said further mist collector for removing sedimentary particles from the washing liquid for allowing recirculation of the washing liquid into said gas scrubber.

7. The apparatus of claim 6, and further comprising an ionization stage following said quencher for applying a voltage to the passing gas stream.

8. The apparatus of claim 6 wherein said separating means includes a sedimentation tank.

* * * * *

UNITED STATES PATENT AND TRADEMARK OFFICE
CERTIFICATE OF CORRECTION

PATENT NO. : 5,427,608
DATED : June 27, 1995
INVENTOR(S) : Auer et al.

It is certified that error appears in the above-identified patent and that said Letters Patent is hereby corrected as shown below:

On the title page, Item

[73] Assignee: Change "Voest-Alpine Industrieanlagenges,m.b.H." to --Voest-Alpine Industrieanlagenbau Gesellschaft m.b.H.-- and after "Voest-Alpine Industrieanlagenbau Gesellschaft m.b.H." add --and Voest-Alpine Stahl Linz Gesellschaft m.b.H.--

Signed and Sealed this

Thirty-first Day of October 1995

Attest:

BRUCE LEHMAN

*Attesting Officer*     *Commissioner of Patents and Trademarks*